United States Patent [19]

Hirsbrunner et al.

[11] Patent Number: 5,079,019

[45] Date of Patent: Jan. 7, 1992

[54] PROCESS FOR ELIMINATION OF CHLOROHYDRINS FROM PROTEIN HYDROLYSATES

[75] Inventors: Pierre Hirsbrunner, Corseaux; Hans Weymuth, La Tour-De-Peilz, both of Switzerland

[73] Assignee: Nestec S.A., Vevey, Switzerland

[21] Appl. No.: 464,185

[22] Filed: Jan. 12, 1990

[30] Foreign Application Priority Data

Feb. 3, 1989 [EP]  European Pat. Off. ........ 89101855.8

[51] Int. Cl.$^5$ .............................................. A23L 1/28
[52] U.S. Cl. .................... 426/429; 426/424; 426/656
[58] Field of Search ............... 426/650, 656, 422, 425, 426/429, 430, 424

[56] References Cited

U.S. PATENT DOCUMENTS 3,493,385  2/1970  Hack .................................... 426/424
4,544,567  10/1985  Gottesman .......................... 426/417
4,759,944  7/1988  Fäsi et al. ............................ 426/650

FOREIGN PATENT DOCUMENTS 0226769  7/1987  European Pat. Off. .

OTHER PUBLICATIONS

Bikbulatov, I. Kh. "Chlorohydrins. II. Preparation of a Stable Nonaqueous Solution of Hypochlorous Acid". Izv. Sib. Otd. Akad. Nauk SSSR, Sev. Khim. Nauk., Apr. 1984, pp. 137-141 (Chemical Abstract 102(3):2409g Only.
G. Lalasidis, "Four New Methods of Debittering Protein Hydrolysates and a Fraction of Hydrolysates with High Content of Essential Amino Acids," Ann. Nutr. Alim, 1978, 32, 709-723.
Velisek et al., "Chlorohydrins in Protein Hydrolysates," Z. Lebensm Unters Forsch, 167, 241 (1978), pp. 241 $\propto$ 244.

Primary Examiner—Donald E. Czaja
Assistant Examiner—Anthony Weier
Attorney, Agent, or Firm—Vogt & O'Donnell

[57]  ABSTRACT

Chlorohydrins are eliminated from protein hydrolysates by countercurrent liquid/liquid extraction using 1-butanol, 2-butanol, isobutanol, or methyl ethyl ketone as a solvent.

13 Claims, No Drawings

PROCESS FOR ELIMINATION OF CHLOROHYDRINS FROM PROTEIN HYDROLYSATES

BACKGROUND OF THE INVENTION

This invention relates to a process for elimination chlorohydrins from protein hydrolysates.

It was recently found in the production of protein hydrolyzates that a considerable quantity of chlorohydrins was present therein. Accordingly, it appeared highly desirable on an industrial level to find a method for eliminating these chlorohydrins. European Patent Application 226 769 describes one process for eliminating these chlorohydrins, namely dichloropropanediols (DCPS). This term encompasses two isomers, namely 1,3-dichloro-2-propanol and 2,3-dichloro-1-propanol. The known process is based or elimination of the DCPS by stripping with steam under reduced pressure.

SUMMARY OF THE INVENTION

The present invention relates to another process for the extraction of chlorohydrins from protein hydrolyzates. Chlorohydrins are understood to be both the DCPS and the monochloropropanediols (MCPS), namely 3-chloro-1,2-propanediol and 2-chloro-1,3-propanediol. The content of the first isomer in the hydrolyzate is approximately 10 times higher than the content of the second isomer.

The object of the present invention is to provide a simple and effective extraction process in which no change is made to the basic process of obtaining the hydrolyzates mentioned and in which the end product obtained is identical with the product presently available on the market, i.e. a product having the same organoleptic qualities. To this end, the process according to the invention does not use any chemical reaction during the extraction of the MCPS and DCPS.

DETAILED DESCRIPTION OF THE INVENTION

In the process according to the invention the hydrolyzate is subjected after separation of the first or second insolubles to countercurrent liquid/liquid extraction with a solvent selected from the group consisting of ethyl acetate, 1-butanol, 2-butanol, isobutanol and methyl ethyl ketone to eliminate the MCPS and the DCPS therefrom and then to stripping with steam to eliminate the residual solvent. Finally, the hydrolyzate is concentrated to eliminate the residual water.

The choice of the solvent has been dictated by the need to use a product which is acceptable under the various laws governing food products, which is immiscible with water, which has a high affinity for the MCPS and which, in the interests of economy, is capable of regeneration. The solvents mentioned above satisfy these four requirements.

The process according to the invention may be carried out in batches, continuously or semi-continuously using any type of liquid/liquid extractor known in the art, in particular gravity columns, pulsed columns, columns with rotating plates or Karr columns. A mixer/separator or an extractor/centrifuge may also be used.

Sources of vegetable proteins of various origins are used as starting material in the process according to the invention. For example, it is possible to use oil seed cakes, cereal gluten or fat-extracted soya flour.

The hydrolysis step is carried out using concentrated hydrochloric acid, for example a 4N to 8N hydrochloric acid and preferably a 6N hydrochloric acid which thus has a concentration of approximately 15 to 25% and preferably 18 to 20% by weight. The hydrolysis step is carried out in enamelled tanks in which the starting material is slowly stirred in the acid for several hours, for example for 6 to 13 hours, at a temperature of 70° to 120° C. A dark-coloured hydrolyzate containing a high proportion of insoluble so-called humic substances, referred to herein as the first insolubles, is generally obtained in this first stage. The hydrolyzate is neutralized with a concentrated base, preferably sodium carbonate in dry or paste-like form, to a pH value of approximately 5.0 to 6.0. The neutralized hydrolyzate is then filtered to eliminate the first in-solubles therefrom. The hydrolyzate is subjected to the countercurrent extraction step in this second stage or after it has been left standing. The hydrolyzate may be left standing for a more or less long period, for example a few days to a few weeks, depending on the purpose for which it is intended, to promote the separation of slowly crystallizing substances and slowly agglomerating colloidal particles referred to herein as the second insolubles. The second insolubles may be separated by filtration. Finally, the hydrolyzate may be subjected to the countercurrent extraction step in this third stage if this was not done after separation of the first insolubles. A dark-coloured liquid hydrolyzate is obtained, its quality being regarded as better, the higher its density. Accordingly, the various stages of the process as described above are preferably carried out to obtain a density of the hydrolyzate of from 1.250 to 1.265 g/cm$^3$.

The MCP content of the hydrolyzate depends on the process used for its production. It is normally between 50 and 300 ppm. The DCP content is between 5 and 20 ppm.

The analysis method used to determine the DCP content, i.e. the concentration of DCPS in the seasoning, is the same as that mentioned in the above-cited patent application EP 226 769.

The analysis method for the MCPS, similar to that for the DCPS, is described hereinafter.

The height of the column used for the extraction depends on the starting MCP content and the tolerated final content. Where a pulsed column is used, it is between 6 and 20 m for approximately 15 to 20 theoretical plates. In industrial processes, the column is operated at a throughput of 500 to 1500 l hydrolyzate/hour.

After extraction with the solvent, 1 to 2% of the solvent used remains in the hydrolyzate. This residue has an adverse affect on taste so that it is absolutely essential to eliminate it. This is done by stripping with steam, for example using a column of the type described in EP 226 769 and under the same operating conditions.

Because the stripping with steam introduces water into the hydrolyzate, the water then has to be removed to obtain a product closer to the starter product containing approximately 50% dry matter. This concentration is carried out in the usual way, for example in vacuo in an evaporator.

After extraction with the solvent, stripping with steam, concentration of the hydrolyzate and standardization of the pH by addition of hydrochloric acid to adjust a pH of 5.2 to 5.8 and preferably of the order of 5.4, the final hydrolyzate has a dry matter content of 46 to 50%, contains less than 500 ppb of MCP and is free from DCP.

The process according to the invention enables the two MCP isomers to be extracted from the hydrolyzate.

A ratio by volume of hydrolyzate to solvent of from 1:0.5 to 1:2 is used for the solvent extraction step. If too little solvent is introduced, extraction of the MCPS is inadequate whereas, if too much solvent is introduced, a large quantity of solvent to be purified is obtained which, on an industrial level, is unacceptable.

The countercurrent extraction step is normally carried out at atmospheric pressure and at a temperature in the range from 15° to 30° C. and preferably at ambient temperature. The preferred solvent for the process according to the invention is 1-butanol. It has a high affinity for the MCPS, shows good technological behaviour and may readily be used at an industrial level. In this case, the ratio by volume of hydrolyzate to solvent is of the order of 1:1.

To ensure that the process according to the invention is economical, the solvent used is purified by distillation, by stripping with steam or by amminolysis and is reused for another extraction. On an industrial level, purification by stripping with steam is the most favourable method. A solvent substantially free from MCP is obtained in this way.

EXAMPLES

The process according to the invention is illustrated by the following Example which is preceded by description of the method used to determine the MCP content of the present hydrolyzates. The percentages and parts are by weight unless otherwise indicated.

Method of determination of the MCP content

Principle:

The method comprises adsorption of the product to be analyzed onto a column, elution of the MCP with ethyl acetate and quantitative analysis by gas-phase chromatography using a capillary column and detection by electron capture.

Reactants:
1. Eluent: ethyl acetate
2. 4 μg/ml solution of trichlorobenzene in the eluate.
3. Mixed standard solutions having identical concentrations 0.1 ,μg/ml trichlorobenzene, but graduated concentrations of 0.125; 0.25; 0.5 and 1 μg/ml of MCP in the eluate. 4. 20% solution of NaCl in distilled water.

Apparatus

Gas-phase capillary column chromatograph with slot injector and detection by electron capture (ionization of a "reactive" gas consisting of 95 parts argon and 5 parts methane by the radiation emitted by $^{63}Ni$)
Integrator and/or recorder

Samples

The samples of which the MCP content is assumed to be higher than 2 ppm are diluted with the 20% NaCl solution (reactant 4).
Similarly, 20% NaCl are added to the condensates.

Elution

Quantities of 20 g of samples are introduced into the upper part of a vertical small column or cylindrical cartridge packed with a granular filling.

The sample is allowed to penetrate into the filling for 15 minutes.

Three times 20 ml eluent (reactant 1) are then poured into the column and approximately 40 ml eluate are collected in approximately 20 minutes at the lower end of the column.

1 ml of a trichlorobenzene solution (reactant 2) is added to these 40 ml of eluate.

Chromatography

A capillary column of fused silica 30 m in length and 0.32 mm in diameter coated with a 0.25 m thick layer of polyethylene glycol having a degree of polymerization of 20,000 is used.

The column is heated to a temperature of 200° C. 24 h in advance.

The sample is subjected to a heating program in which is it kept for 8 minutes at 120° C., then heated to 200° C. at 8° C./minute and subsequently kept for 12 minutes at 200° C.

The injector is heated to a temperature of 250° C. and the opening of the slot is adjusted to 1:10.

The injected sample is adjusted to a volume of 1.5 1 (of which only 1/10th enters the column).

Hydrogen under a pressure of 1.4 bar is used as the carrier gas.

The detector is heated to a temperature of 300° C. 24 hours in advance.

A mixture of nitrogen and methane in a ratio of 95:5 is used as the reaction gas (flow rate 60 ml/minute) after drying by passage through a molecular filter.

The retention time is approximately 4.07 minute for the trichlorobenzene, approximately 4.3 minute for the DCPS and 11.9 and 13.2 minutes for the 3- and 2- MCPS, respectively.

Results

The height and/or surface area of the peaks obtained for the sample and for the mixed standard solutions (reactant 3) are compared.

For the mixed standard solution which comes closest to the sample, the ratio between the heights and/or surface areas of the peaks corresponding to the MCP and to the trichlorobenzene is formed.

The corresponding ratio is formed for the peaks of the sample.

The quotient of the two ratios enables the MCP content of the sample to be established.

Limits of the method

The concentration limit detectable by the present method is at approximately 0.05 to 0.1 ppm (0.05 to 0.1 mg MCP per kg sample).

The degree of extraction of the MCP reached with the present method is above 90%.

Example

A peanut oil cake is hydrolyzed for 8 hours at 107° C. with 20% hydrochloric acid. The humic substances or so-called first insolubles are separated from the hydrolyzate by filtration. The hydrolyzate is then left standing for two weeks to allow precipitation of the second insolubles which are separated by filtration. A hydrolyzate containing 230 ppm MCP with a dry matter content of 48% is obtained. 793 liters (1000 kg) of this hydrolyzate are treated with 793 liters of butanol in countercurrent in an 8 meter pulsed column containing 15 theoretical plates. The column is operated with a throughput of 10 1/h of butanol and with the same throughput for the hydrolyzate at ambient temperature and at atmospheric pressure. The hydrolyzate obtained at the column exit contains no DCP at all, 0.3 ppm MCP and 1 to 2% butanol and has a pH of 5.9.

The hydrolyzate is then subjected to stripping with steam under a pressure of 0.29 bar at a product temperature of 62° to 64° C. with a throughput of 15 to 20 1/h and with 150 kg steam. No more butanol can be detected at the column exit. The product has to be concentrated to remove the water introduced in the preceding step. This concentration step is carried out in vacuo in a rotary evaporator to extract 50 kg water. Finally, 4 kg 32% hydrochloric acid are added to obtain 940 kg hydrolyzate of pH 5.45 which has a dry matter content of 48% and contains less than 500 ppb MCP.

Finally, the butanol is treated to eliminate the MCPS so that it may be reused for another extraction.

100 1 butanol containing the MCPS are treated with 5 1 25% $NH_3$ at 60° C. After 6 days, there is no longer any detectable MCP.

The final hydrolyzate obtained was found to be identical with the starting product from the organoleptic view-point.

Accordingly, the invention provides a simple and effective process which integrates effectively into existing production processes, enabling the MCP and DCP contents of the hydrolyzate to be reduced to an acceptable level.

We claim:

1. A process for eliminating chlorohydrins from a protein hydrolysate comprising subjecting a protein hydrolysate to countercurrent liquid/liquid extraction with a solvent selected from the group consisting of 1-butanol, 2-butanol, isobutanol and methyl ethyl ketone for eliminating monochloropropanediols and dichloropropanediols from the hydrolysate.

2. A process according to claim 1 wherein a volume ratio of the hydrolysate to the solvent is from 1:0.5 to 1:2.

3. A process according to claim 1 or 2 wherein the countercurrent extraction is carried out at a temperature of 15° C. to 30° C. under atmospheric pressure.

4. A process according to claim 4 wherein the hydrolysate is prepared by hydrolysis with concentrated hydrochloric acid and is neutralized prior to extraction.

5. A process according to claim 4 wherein the hydrolysate is extracted with the solvent after first and second insolubles are separated from the hydrolysate.

6. A process according to claim 4 wherein the hydrolysate is extracted with the solvent after first insolubles are separated from the hydrolysate.

7. A process according to claim 6 wherein second insolubles are separated from the extracted hydrolysate.

8. A process according to claim 5 or further comprising stripping the extracted hydrolysate with steam for eliminating residual solvent.

9. A process according to claim 8 further comprising adding hydrochloric acid to the hydrolysate after stripping with steam to adjust the pH to between 5.2 and 5.8.

10. A process according to claim 1 wherein the solvent is 1-butanol.

11. A process according to claim 10 wherein a volume ratio of the hydrolysate to the solvent is from 1:0.5 to 1:2.

12. A process according to claim 11 wherein the ratio by volume of hydrolysate to solvent is 1:1.

13. A process according to claim 12 wherein the extraction is carried out at a temperature of 15° C. to 30° C. under atmospheric pressure.

* * * * *

UNITED STATES PATENT AND TRADEMARK OFFICE
CERTIFICATE OF CORRECTION

PATENT NO. : 5,079,019

DATED : January 7, 1992

INVENTOR(S) : Pierre Hirsbrunner, et al

It is certified that error appears in the above-identified patent and that said Letters Patent is hereby corrected as shown below:

Column 1, line 8, "elimination" should be --eliminating--.

Column 6, line 9, "4" should be --1--.

Column 6, line 20, after "or" insert --6--.

Signed and Sealed this

Twenty-third Day of March, 1993

Attest:

STEPHEN G. KUNIN

Attesting Officer

Acting Commissioner of Patents and Trademarks